United States Patent
Tsai

(10) Patent No.: US 7,167,733 B2
(45) Date of Patent: Jan. 23, 2007

(54) PORTABLE TELEPHONE WITH DETACHABLE EARPHONE AND MICROPHONE MODULES

(75) Inventor: Ming Chiang Tsai, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 264 days.

(21) Appl. No.: 10/848,289

(22) Filed: May 17, 2004

(65) Prior Publication Data

US 2004/0229667 A1 Nov. 18, 2004

(30) Foreign Application Priority Data

May 16, 2003 (TW) .............................. 92209067 U

(51) Int. Cl.
*H04M 1/00* (2006.01)

(52) U.S. Cl. .............................. 455/575.2; 455/575.6; 455/425; 455/570; 455/575.4; 455/347; 455/569.1; 381/122; 381/111; 379/328; 379/325

(58) Field of Classification Search .. 455/575.1–575.6, 455/569.1, 570, 347, 425; 381/122, 111, 381/390, 74, 376, 374; 379/328, 325, 330, 379/428.02, 428, 433
See application file for complete search history.

(56) References Cited

U.S. PATENT DOCUMENTS

| 6,452,626 | B1 | 9/2002 | Adair | |
|---|---|---|---|---|
| 6,643,528 | B1* | 11/2003 | Shim et al. | 455/575.2 |
| 2004/0204165 | A1* | 10/2004 | Huang | 455/569.1 |

* cited by examiner

*Primary Examiner*—Lester Kincaid
*Assistant Examiner*—Emem Ekong
(74) *Attorney, Agent, or Firm*—Wei Te Chung

(57) ABSTRACT

A portable telephone (10) includes comprises a main body (11), a detachable member (12), a data transmission cable (13), and a spring biased spool (20). The detachable member includes an earphone module (121), a microphone module (122), and a rolling member (14). The detachable member is attachable to a top surface of the main body when the earphone and microphone modules are not in use. The spring biased spool is mounted within the main body. Opposite ends of the data transmission cable respectively connect with the spring biased spool and the detachable member. The spring biased spool enables the data transmission cable to be extended or retracted. When the data transmission cable is retracted, it is housed within the main body, and the detachable member can be firmly attached on the main body. The rolling member allows the earphone and the microphone modules to conveniently separate from each other at the beginning of a call, and to be conveniently coupled together at the end of a call.

18 Claims, 5 Drawing Sheets

PORTABLE TELEPHONE WITH DETACHABLE EARPHONE AND MICROPHONE MODULES

BACKGROUND OF THE INVENTION

1. Field of the Invention

The present invention relates to a portable telephone for conducting wireless telephonic communications, and especially to a telephone having an earphone, a microphone and a video camera that can be conveniently detached from and coupled with a main body of the telephone.

2. Description of the Prior Art

A conventional mobile phone 40 is shown in FIG. 5. The mobile phone 40 is primarily intended for two-way speech communication, and for this purpose the mobile phone 40 has a microphone 41 and a speaker 42. The mobile phone 40 also has a keypad 43 for controlling the operation thereof, and a display 44 for showing information to the user. During a telephone call, the user holds the mobile phone 40 next to his head, so that the speaker 42 is located adjacent the user's ear and the microphone 41 is located as close to the mouth as possible. However, the mobile phone 40 operates by using electromagnetic waves to receive and transmit signals, and certain medical opinion associates the proximity of electromagnetic waves with health problems in some users. Additionally, during a call it is practically impossible to use the keypad 43 to input data or to read information on the display 44. In cases when the user needs to use the keypad 43 and/or the display 44 also during a call, he/she must move the mobile phone 40 to an inconvenient position in which either the speaker 42 is too far from the ear or the microphone 41 is far from the mouth, or both.

Accordingly, mobile phones have been developed which provide the earphone and microphone mounted on a soft cable. One end of the soft cable is pluggable into a main body of the phone. In use, the main body can be positioned for easy use of a keypad and display thereof, while the earphone and the microphone are respectively adjacent to the user's ear and mouth. In addition, the main body is positioned relatively far from the user's head, thereby reducing exposure of electromagnetic waves thereto. However, the soft cable must generally be plugged into the main body at the beginning of each call, and must then be unplugged at the end of the call. These repeated operations can be unduly inconvenient. Furthermore, the soft cable is liable to become tangled, particularly when it is unplugged and has one more loose end.

In order to resolve these problems, another kind of mobile phone is disclosed in Chinese Patent No. 98203357.5. Referring to FIG. 6, a mobile phone 30 includes a main body 31, a detachable earphone 33, a detachable microphone 32, a data transmission cable 38, and a spring biased spool (not shown) housed in the main body 31. The microphone 32 and the earphone 33 are respectively mounted on two ends of a flexible metallic pipe 34. Opposite ends of the data transmission cable 38 connect with the metallic pipe 34 and the spring biased spool, respectively. The spring biased spool enables the data transmission cable 38 to be extended or retracted. A slot 36 is provided in a side wall of the main body 31, which allows the metallic pipe 34 to be located therein when the data transmission cable 38 is retracted. The phone 30 can reduce the user's exposure to electromagnetic waves, and the earphone 33 and the microphone 32 can be set in the phone 30 when not in use. However, the metallic pipe 34 must be long enough to span a distance between a user's ear and mouth, yet also short enough to be able to conveniently fit within the side wall of the main body 31. The earphone 33 and the microphone 32 are mounted on the one metallic pipe 34, and the length of the metallic pipe 34 is not adjustable. Nowadays, many mobile phones are so small as to make deployment of the metallic pipe 34 unsuitable or impractical. Furthermore, at the beginning of a call, the user must draw the metallic pipe 34 out from the slot 36 and manually adjust the positions of both the earphone 33 and the microphone 32. Similarly, at the finish of a call, the user must manually put the metallic pipe 34 back into the slot 36. These operations can be very inconvenient.

Therefore, a new mobile phone providing convenient use of an earphone and microphone thereof is desired.

SUMMARY OF THE INVENTION

Accordingly, an object of the present invention is to provide a miniaturized portable telephone which enables convenient use of an earphone and a microphone thereof.

Another object of the present invention is to provide a portable telephone having convenient manual operation of an earphone and a microphone thereof.

To achieve the above objects, a portable telephone of the present invention comprises a main body, a detachable member, a data transmission cable and a spring biased spool. The detachable member comprises an earphone module, a microphone module, and a rolling member. The detachable member is attachable to a top surface of the main body when the earphone and microphone modules are not in use. The spring biased spool is mounted within the main body. Opposite ends of the data transmission cable respectively connect with the spring biased spool and the detachable member. The spring biased spool enables the data transmission cable to be extended or retracted. When the data transmission cable is retracted, it is housed within the main body, and the detachable member can be firmly attached on the main body. The rolling member allows the earphone module and the microphone module to conveniently separate from each other at the beginning of a call, and to be conveniently coupled together at the end of a call.

In a preferred embodiment, the rolling member is a gear module. The gear module comprises two gears respectively mounted to the earphone module and the microphone module. The two gears can roll in opposite directions so that the earphone module and the microphone module separate under gravity, and couple together when the detachable member is attached to the main body.

Other objects, advantages and novel features of the present invention will be apparent from the following detailed description of preferred embodiments thereof with reference to the attached drawings, in which:

DETAILED DESCRIPTION OF THE PREFERRED EMBODIMENTS

Figure 1:
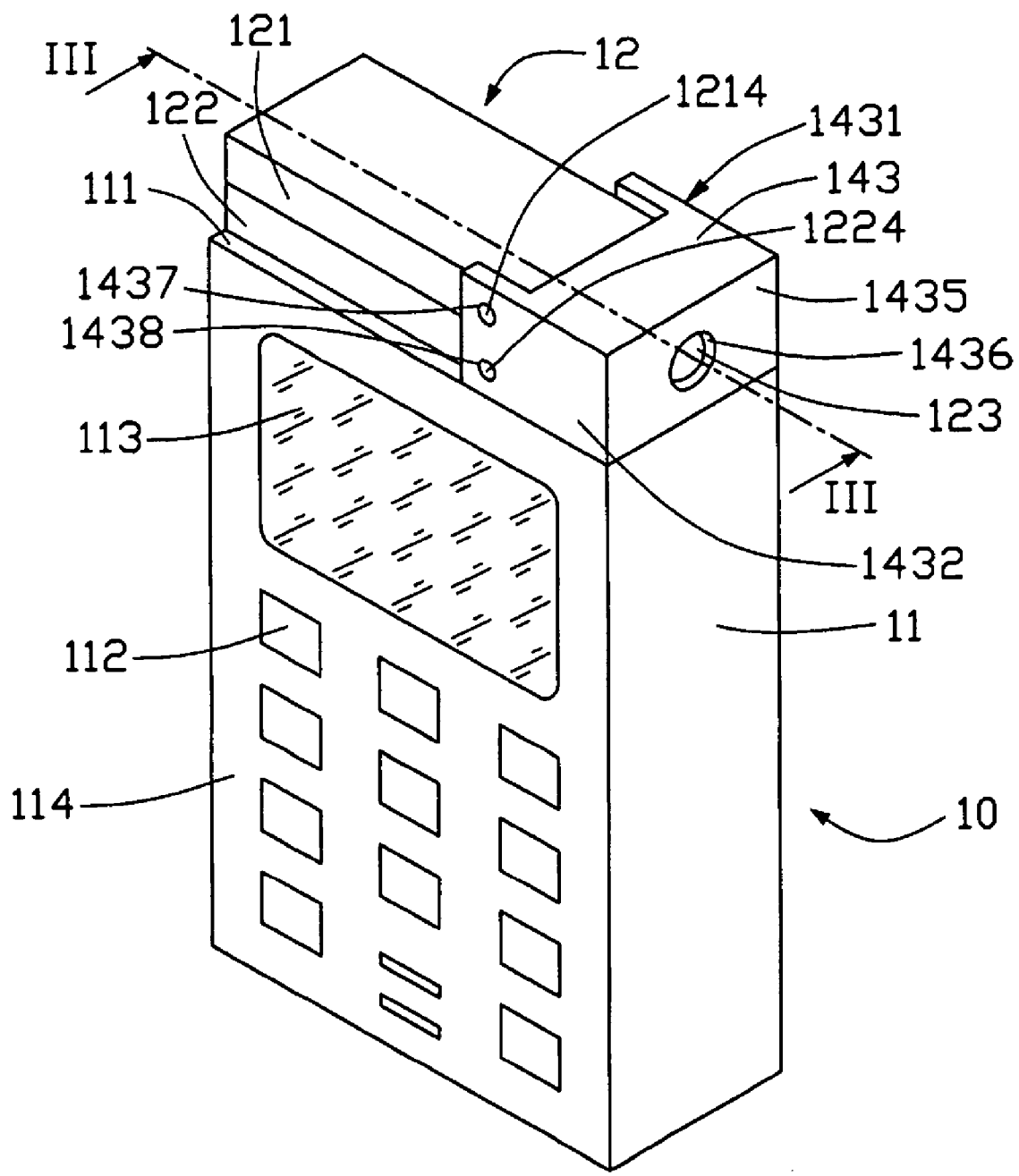
FIG. 1 is an isometric view of a portable telephone of the present invention, the portable telephone comprising a main body and a detachable member.
Figure 2:
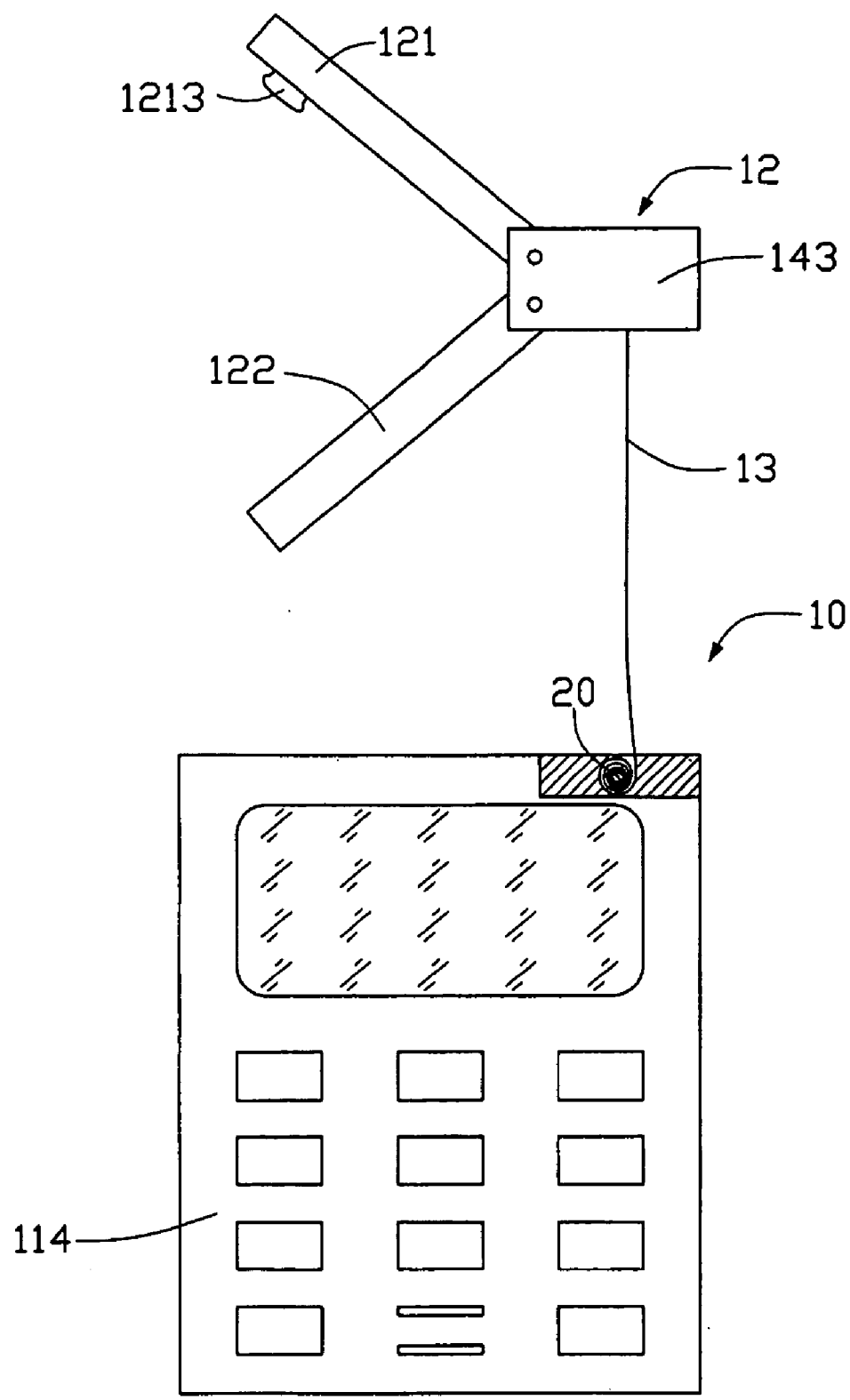
FIG. 2 is a front elevation of the portable telephone of FIG. 1, partly cut away and showing the detachable member detached from the main body.

Referring to FIGS. 1 and 2, a portable telephone 10 of a preferred embodiment of the present invention comprises a main body 11, a detachable member 12, a flexible data transmission cable 13 and a spring biased spool 20. The detachable member 12 is detachably attached to a top surface of a top wall 111 of the main body 11. In alternative embodiments, the detachable member 12 can be detachably attached to any of other suitable surfaces of the main body 11. The spring biased spool 20 is mounted within the main body 11, enabling the data transmission cable 13 to be extended or retracted. In an alternative embodiment, the spring biased spool 20 may be replaced by another kind of suitable retracting device. The data transmission cable 13 extends between the detachable member 12 and the spring biased spool 20, and is housed completely within the main body 11 when it is in a retracted position. The main body 11 has a plurality of controls, such as keys 112 and a view screen 113, defined on a main surface 114 thereof. The keys 112 are for a user to operate the functions of the telephone 10. The view screen 113 is for displaying video images taken by a video camera module 123 (see FIG. 3), and for viewing incoming video information received from a remote location.

Figure 3:
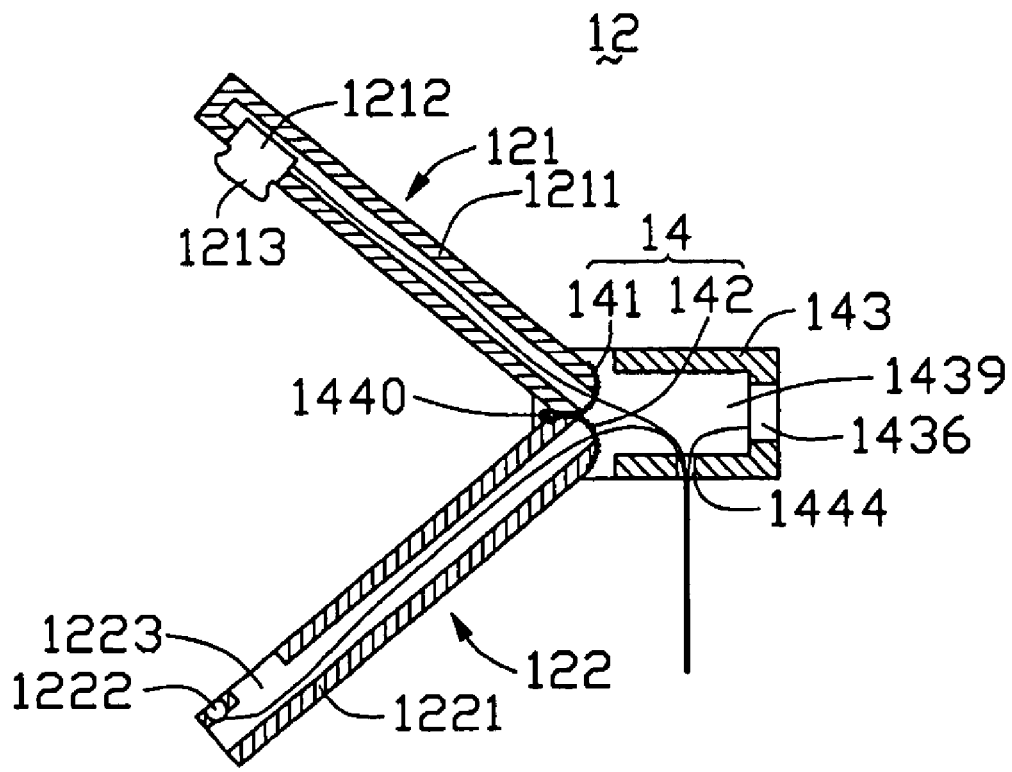
FIG. 3 is a cross-sectional view of the detachable member of FIG. 1 from III—III drection, showing an earphone module and a microphone module thereof in respective open positions.
Figure 4:
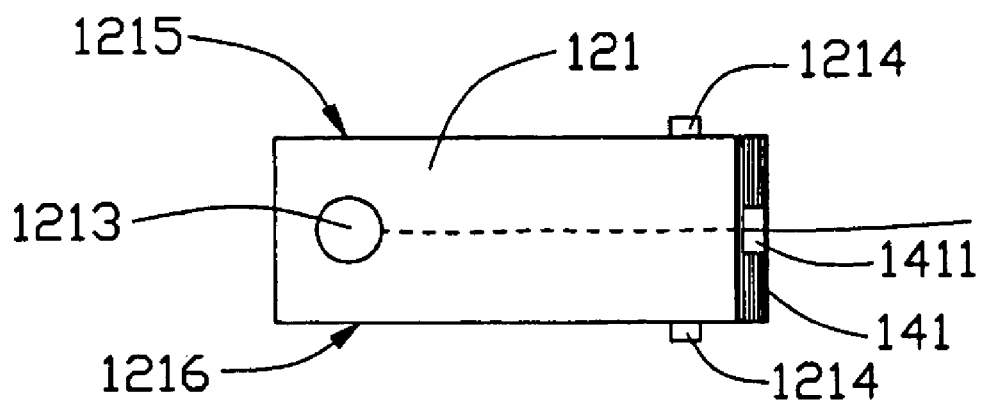
FIG. 4 is a bottom elevation view of the earphone module of FIG. 3.
Figure 5:
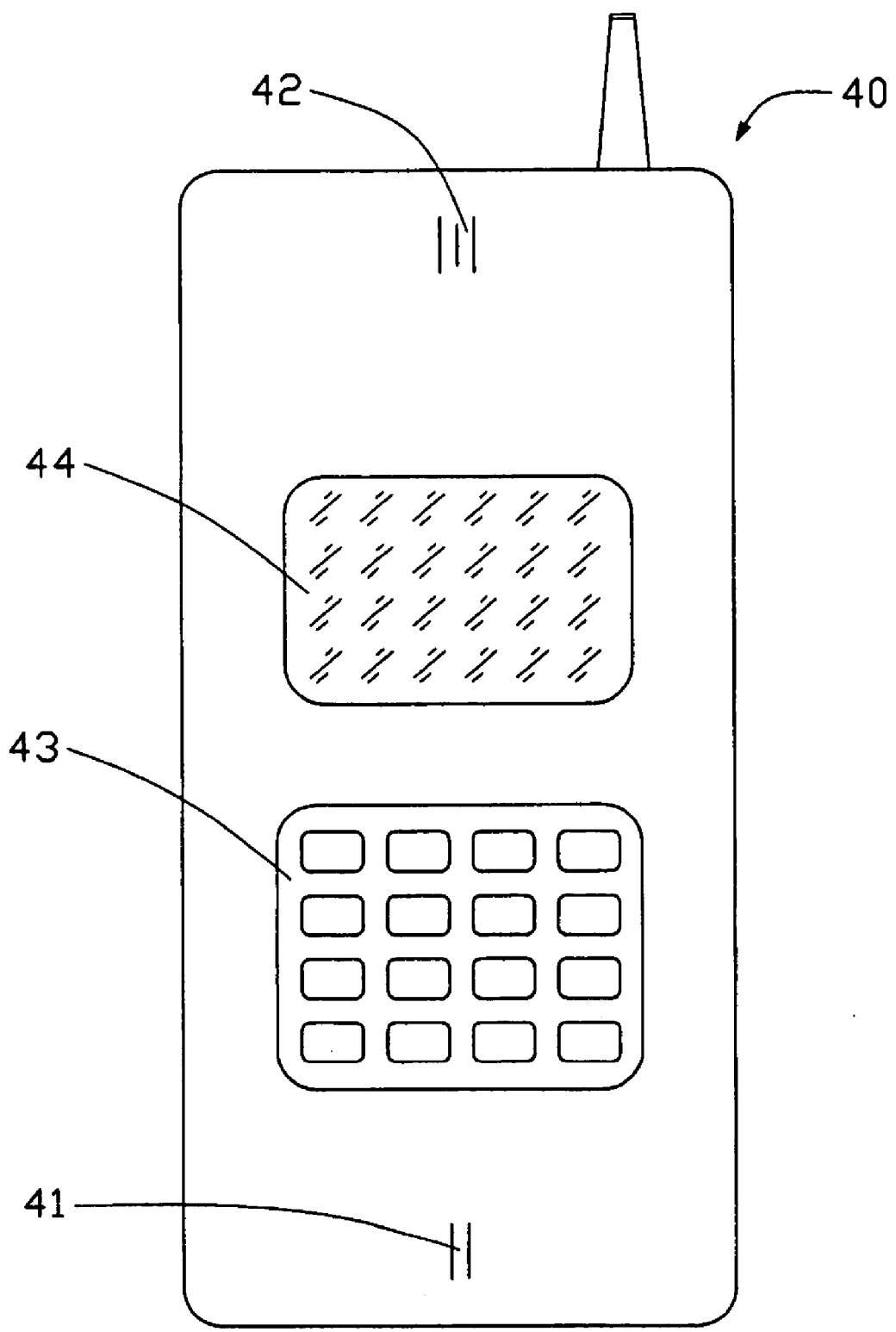
FIG. 5 is a front elevation of a conventional portable telephone.
Figure 6:
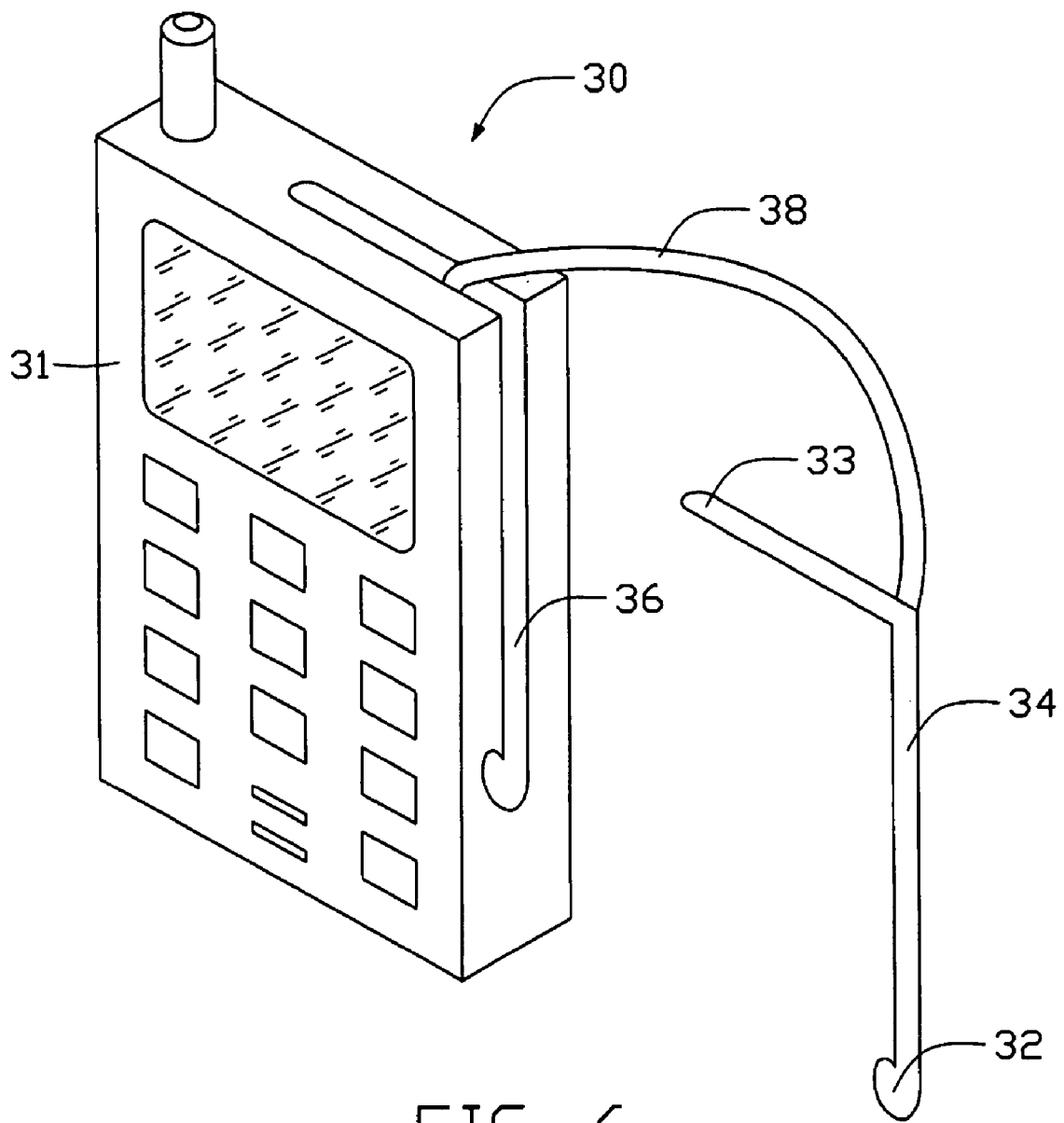
FIG. 6 is an isometric view of another conventional portable telephone, showing an earphone and a microphone detached from a main body thereof.

Also referring to FIGS. 3 and 4, the detachable member 12 includes an earphone module 121, a microphone module 122, the video camera module 123 and a rolling member 14. The detachable member 12 is generally parallelepiped-shaped. In alternative embodiments, the detachable member 12 may have other shapes, including shapes that conform with contours of the corresponding main body 11. The rolling member 14 interconnects the earphone module 121 and the microphone module 122. By rotating the rolling member 14, the earphone module 121 and the microphone module 122 rotate relative to each other between respective closed positions and respective open positions.

In the preferred embodiment, the rolling member 14 is a gear module comprising a first gear 141 and a second gear 142. The first and second gears 141, 142 have a same structure, are respectively mounted on ends of the earphone module 121 and the microphone module 122, and roll in opposite directions to each other. In the preferred embodiment, the rolling member 14 further includes a generally parallelepiped-shaped frame 143. The frame 143 comprises a left wall 1431, a right wall 1432, a top wall (not labeled), a bottom wall (not labeled), and a base wall 1435. Said five walls of the frame 143 cooperatively define a cavity 1439 therebetween. Said ends of the earphone module 121 and the microphone module 122 with the gears 141, 142 are located in the cavity 1439. A stopping pole 1440 is mounted in the frame 143 at the rolling member 14, between the earphone module 121 and the microphone module 122. Opposite ends of the stopping pole 1440 are attached to the left and right walls 1431, 1432 respectively. The left and right walls 1431, 1432 are longer than the top and bottom walls, so tat two cutouts (not labeled) are defined in the top and bottom walls respectively, between the left and right walls 1431, 1432. Said ends of the earphone module 121 and the microphone module 122 with the gears 141, 142 are movable in the cutouts respectively. An end portion of each of the left and right walls 1431, 1432 at the cutouts defines a pair of pivot holes 1437, 1438. The base wall 1435 defines an aperture 1436 therein, for containing the video camera module 123. An access hole 1444 is defined in the bottom wall. The data transmission cable 13 passes through the access hole 1444 into the frame 143, and mechanically and electrically connects with the earphone module 121, the microphone module 122 and the video camera module 123.

The earphone module 121 is parallelepiped-shaped, and has a width slightly less than a corresponding width of the cavity 1439. The earphone module 121 includes a tube 1211, an earphone 1212, and an earphone cable (not labeled). The tube 1211 is made of flexible metallic material. One end of the tube 1211 is closed, and the opposite end at the first gear 141 defines a through hole (not labeled). Alternatively, said opposite end may define an opening. The earphone 1212 is mounted in a bottom wall (not labeled) of the tube 1211 near the closed end, and has an earplug 1213 protruding out from the tube 1211. The earplug 1213 is easily put into the user's ear when the user makes or receives calls. The first gear 141 is mounted on said opposite end of the tube 1211. Two opposite ends of the first gear 141 respectively reach a top wall (not labeled) and the bottom wall (not labeled) of the tube 1211. A recess 1411 is defined in a middle of the first gear 141. The recess 1411 and the through hole of said opposite end of the tube 1211 enable the earphone cable extending out from the main body 11 to pass through the first gear 141 and the tube 1211, and thereby electrically connect the earphone 1212 to circuitry in the main body 11. The tube 1211 further includes a pair of aligned pivot pins 1214 extending out from the left wall 1215 and the right wall 1216 thereof respectively. The pivot pins 1214 are pivotably received in the pivot holes 1437 of the left and right walls 1431, 1432 of the frame 143.

The microphone module 122 has substantially the same configuration as the earphone module 121, and includes a tube 1221, a microphone 1222 and a microphone cable (not labeled). The tube 1221 has substantially the same configuration as the tube 1211. That is, one end of the tube 1221 is closed, and the opposite end at the second gear 142 defines a through hole (not labeled). Alternatively, said opposite end may define an opening. A plughole 1223 is defined in a top wall (not labeled) of the tube 1221 near the closed end, for receiving the earplug 1213 when the earphone module 121 is coupled to the microphone module 122. The microphone 1222 is mounted in a microphone hole (not labeled) defined in the tube 122 near the closed end. The second gear 142 is mounted on said opposite end of the tube 1221. Two opposite ends of the second gear 142 respectively reach the top wall (not labeled) and a bottom wall (not labeled) of the tube 1221. A recess (not labeled) is defined in a middle of the second gear 142. Said recess and the through hole of said opposite end of the tube 1221 enable the microphone cable extending out from the main body 11 to pass through the second gear 142 and the tube 1221, and thereby electrically connect the microphone 1222 to circuitry in the main body 11. The tube 1221 further includes a pair aligned pivot pins 1224 extending out from a left wall (not labeled) and a right wall (not labeled) thereof respectively. The pivot pins are pivotably received in the pivot holes 1438 of the left and right walls 1431, 1432 of the frame 143.

In use, the user grasps the frame 143 of the detachable member 12, and detaches the detachable member 12 from the top wall 111 of the main body 11. The data transmission cable 13 is thereby extended out from the main body 11. The user puts the earphone module 121 into his/her ear, and at the same time the microphone module 122 rotates down away from the earphone module 121 due to gravity. That is, the gears 141, 142 of the rolling member 14 rotate in opposite directions. The earphone module 121 and the microphone module 122 continue rotating away from each other about the pivot pins 1214, 1224 until they are stopped by the top and bottom walls of the frame 143 respectively. In this position, the stopping pole 1440 stops the earphone module 121 from falling down. When a call is finished, the user re-attaches the detachable member 12 to the top wall 111 of the main body 11. Simultaneously, the spring biased spool 20 draws the data transmission cable 13 back into the main body 11, and the gears 141, 142 rotate in opposite directions until the earphone module 121 couples with the microphone module 122.

When taking a picture, the user can grasp the frame 143 of the detachable member 12, and detach the detachable member 12 from the top wall 111 of the main body 11. The data transmission cable 13 is thereby extended out from the main body 11. The user then points the video camera module 213 at the desired object. The spring biased spool 20 enables the data transmission cable 13 to be conveniently extended out from and retracted back into the main body 11 while the user adjusts the position of the video camera module 213. Thus the user can easily obtain the desired photo.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable telephone for conducting wireless telephonic communications, comprising:
    a main body;
    a detachable member, which comprises an earphone module, a microphone module and a rolling member, the rolling member connecting the earphone module and the microphone module together so that the earphone and microphone modules can rotatably separate from each other and rotatably couple with each other;
    a spring biased spool mounted within the main body; and
    a data transmission cable extending from the detachable member, the data transmission cable being housed within the main body when it is in a retracted position; wherein
    two opposite ends of the data transmission cable respectively connect with the detachable member and the spring biased spool, and the spring biased spool enables the data transmission cable to be extended or retracted so that the detachable member can be detached from or attached to the main body.

2. The portable telephone claimed in claim 1, wherein the rolling member is a gear module.

3. The portable telephone claimed in claim 2, wherein the gear module comprises two gears having a same structure, and the gears are mounted on the earphone module and the microphone module respectively.

4. The portable telephone claimed in claim 3, wherein each gear defines a recess through which the data transmission cable passes to electrically connect the earphone module end the microphone module to circuitry in the main body.

5. The portable telephone claimed in claim 3, wherein the gear module further comprises a frame, and ends of the earphone module and the microphone module having the gears are contained in the frame.

6. The portable telephone claimed in claim 5, wherein the frame comprises a base wall, a left wall, a right wall, a top wall and a bottom wall, said walls cooperatively defining a cavity therebetween.

7. The portable telephone claimed in claim 6, wherein said ends of the earphone and microphone modules having the gears are located in the cavity.

8. The portable telephone claimed in claim 7, wherein the left wall and the right wall are longer than the top wall and the bottom wall.

9. The portable telephone claimed in claim 8, wherein ends of the left wall and the right wall exceeding the top and bottom walls each define a pair of pivot holes therein.

10. The portable telephone claimed in claim 8, wherein a stopping pole is provided in the cavity of the frame between the earphone module and the microphone module, with opposite ends of the stopping pole respectively connecting with the left wall and the right wall of the frame.

11. The portable telephone claimed in claim 9, wherein the earphone module comprises a tube retaining an earphone, and an earphone cable passes through the tube to electrically connect the earphone to circuitry in the main body.

12. The portable telephone claimed in claim 11, wherein the microphone module comprises a tube for retaining a microphone, and a microphone cable passes through the tube to electrically connect the microphone to circuitry in the main body.

13. The portable telephone claimed in claim 12, wherein each of the tubes comprises two opposite pivot pins pivotably received in the pivot holes of the frame.

14. The portable telephone claimed in claim 12, wherein the gears are mounted on ends of the tubes located in the cavity, such that the gears enable the earphone module to be coupled with or separated from the microphone module.

15. The portable telephone claimed in claim 6, wherein the detachable member further comprises a video camera module.

16. The portable telephone claimed in claim 15, wherein the video camera module is mounted in the frame of the detachable member.

17. The portable telephone claimed in claim 16, wherein the base wall of the frame defines a hole, and the video camera module is housed in the hole.

18. The portable telephone claimed in claim 17, wherein an access hole is defined in the bottom wall of the frame, and the data transmission cable passes through the access hole and electrically connects to the earphone module, the microphone module and the video camera module.

* * * * *